United States Patent [19]

Wright et al.

[11] Patent Number: 4,647,919
[45] Date of Patent: Mar. 3, 1987

[54] METHOD AND APPARATUS FOR MONITORING LIQUID FLOW

[75] Inventors: Herschel E. Wright, Santa Clara; Jan Zaluda, Mountain View, both of Calif.

[73] Assignee: Beckman Instruments, Inc., Fullerton, Calif.

[21] Appl. No.: 790,780

[22] Filed: Oct. 25, 1985

Related U.S. Application Data

[63] Continuation of Ser. No. 500,664, Jun. 3, 1983, abandoned.

[51] Int. Cl.⁴ .............................................. G08B 21/00
[52] U.S. Cl. ................................... 340/608; 340/606; 361/93; 361/106
[58] Field of Search ............... 340/606, 608, 622, 599; 307/118; 324/98, 101; 361/106, 103, 93, 98, 99

[56] References Cited

U.S. PATENT DOCUMENTS

| | | | |
|---|---|---|---|
| 3,147,465 | 9/1964 | Brown et al. | 340/633 |
| 3,290,576 | 12/1966 | Jensen et al. | 361/99 X |
| 3,366,942 | 1/1968 | Deane | 340/608 |
| 3,667,476 | 6/1972 | Muller | 340/599 X |
| 3,747,577 | 7/1973 | Mauch et al. | 73/202 X |
| 3,928,800 | 12/1975 | Strenglein | 73/204 X |
| 4,028,689 | 6/1977 | Schopp | 340/606 X |
| 4,297,881 | 11/1981 | Sasayama et al. | 73/204 |
| 4,322,030 | 3/1982 | Jacobson et al. | 233/23 R |
| 4,354,183 | 10/1982 | Weeks et al. | 340/606 X |
| 4,474,058 | 10/1984 | Drews et al. | 73/204 X |

FOREIGN PATENT DOCUMENTS 1600988 10/1981 United Kingdom ............... 340/606

Primary Examiner—James L. Rowland
Assistant Examiner—Brian R. Tumm
Attorney, Agent, or Firm—William H. May; Paul R. Harder

[57] ABSTRACT

A liquid flow monitor. The device includes a thermistor placed in the path of liquid flow. A circuit including the thermistor in a Wheatstone bridge is used to sense the liquid flow by sensing the change in resistance of the thermistor. A transistor connected to the bridge is used to maintain the thermistor within predetermined levels to prevent overheating of the device.

2 Claims, 2 Drawing Figures

METHOD AND APPARATUS FOR MONITORING LIQUID FLOW

This is a continuation of application Ser. No. 500,664, filed June 3, 1983, now abandoned.

BACKGROUND OF THE INVENTION

1. Field of the Invention

The invention relates to the field of liquid flow. More particularly, the invention relates to a method and device for sensing the presence of a flowing liquid. By way of further characterization, but not by way of limitation thereto, the invention senses the presence of a flowing liquid by monitoring the resistance change in a thermistor located in the path of the flowing liquid.

2. Description of the Related Art

In high speed mechanical apparatus such as centrifuges, it is extremely important that the rotating parts be lubricated both for friction and cooling purposes. That is, in a device such as a high speed centrifuge, oil flow around the rotor shaft and other moving parts of the centrifuge is critical in that a failure of oil flow in these parts could cause a mechanical failure in the device. Such a failure could result in destruction of the device.

Prior centrifuge devices have employed sensors to detect the voltage supplied to the oil pump motor. That is, these devices sense whether the oil pump receives power. However, these devices could not sense whether there was a mechanical breakdown in the oil pump, a stalled pump, or a leak in an oil line resulting in a loss of oil flow to the shaft.

Thermistors and Wheatstone bridges have been employed previously to monitor liquid temperatures. For example, devices such as that disclosed in U.S. Pat. No. 3,918,636 issued to Walter F. Dawson on Nov. 11, 1975 have employed thermistors and Wheatstone bridges to monitor water temperature. However, these devices have not been used to monitor oil flow in an apparatus where oil flow is critical to the operaton of the device and the safety of observers or technicians working in the area.

SUMMARY OF THE INVENTION

The invention is a liquid flow monitor and method which places a thermistor in the path of the liquid flow. The thermistor is one leg of a Wheatstone bridge. The bridge is connected to an amplifying means which receives signals from the bridge. The amplifying means is connected to a signaling means which signals the loss of oil flow. This signal may be used to shut down the apparatus. A controlling means is connected to the amplifying means and the Wheatstone bridge in order that overheating of the thermistor and destruction of the monitor is prevented upon a loss of oil flow.

The controlling means includes a transistor connected to the amplifier and to the Wheatstone bridge. If the oil flow stops, the thermistor will heat up and the circuit will signal the loss of oil flow. However, because the thermistor will continue to heat up in the absence of oil flow, a means for reducing the current in the thermistor is needed in order to prevent the thermistor from overheating and causing the destruction of the device.

DESCRIPTION OF THE PREFERRED EMBODIMENT

Figure 1:
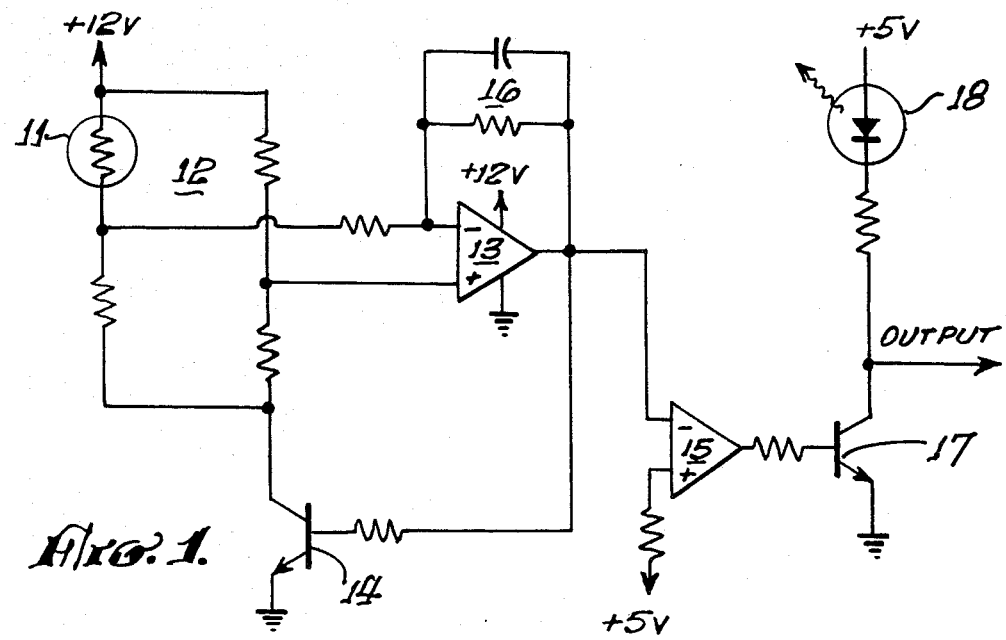
FIG. 1 is a schematic circuit drawing of the thermistor and monitor circuit.

Referring to FIG. 1, a thermistor 11 is one leg of a Wheatstone bridge generally designated as 12. Wheatstone bridge 12 is connected to an amplifier 13. A transistor 14 is connected to amplifier 13 and Wheatstone bridge 12. An amplifier 15 is connected to amplifier 13. An RC circuit generally designated as 16 is connected across amplifier 13. A transistor 17 is connected to amplifier 15. A diode 18 is connected to transistor 17.

Figure 2:
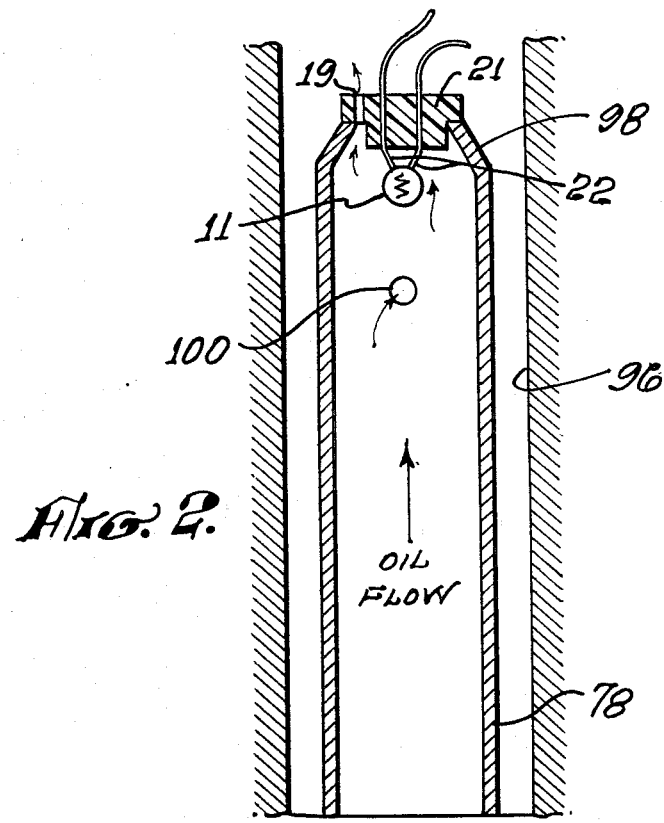
FIG. 2 is a sectional view of a portion of a centrifuge showing the location of the thermistor.

Referring to FIG. 2, a portion of an oil flow system for a centrifuge is shown. For further discussion of this cooling system reference is made to U.S. Pat. No. 4,322,030 issued to K. E. Jackobson et al on Mar. 30, 1982. This patent is assigned to the assignee of the present application. This U.S. Pat. No. 4,322,030 is incorporated herein by reference and made a part of this specification. The reference numerals which are common to the present application and the referenced patent will be maintained. Thermistor 11 is located in top portion 98 of cooling feed tube 78. Orifices 100 provide an outlet for the oil in cooling feed tube 78 to flow into cavity 96 and onto the high speed rotating interior service of cavity 96 thereby coating the interior cavity. This serves to remove heat which is generated by electrical forces in the armature. For further discussion of this process reference is made to the incorporated patent. A third orifice 19 in a plug 21 at the top 98 of cooling food tube 78 is included in order that the oil in cooling feed tube 78 will flow past thermistor 11 and out through plug 21. Thermistor 11 is suspended from plug 21 by wires 22 in order that thermistor 11 be spaced from plug 21 to allow for thermal contact of thermistor 11 and the flowing oil. Wires 22 also provide the electrical connection from thermistor 11 to the circuit of FIG. 1.

MODE OF OPERATION

Referring to FIG. 2, oil in cooling feed tube 78 is forced upward as shown toward orifices 100, thermistor 11, and top portion 98. This oil flows out of orifices 100 and also flows past thermistor 11 and out of orifice 19. This oil is then carried down the inside surface of cavity 96. It is thermistor 11 which is used to sense the flow of oil in cooling feed tube 78. That is, if due to some mechanical or electrical breakdown oil is not pumped in sufficient quantity or pressure into cooling feed tube 78 then oil will not reach thermistor 11 and thermistor 11 will begin to heat up. It is the thermal conductivity of the fluid flowing past thermistor 11 which causes it to cool and thus maintain its resistance. Oil flow is important to the apparatus because if oil is sufficient quantities and at sufficient pressure is not present in cooling feed tube 78, then the apparatus described in the reference patent will overheat and may fail.

Referring to FIG. 1, a means for sensing the resistance change of thermistor 11 due to the oil flow includes Wheatstone bridge 12. Thermistor 11 is heated by a current path from the twelve volt source through the thermistor. The resistance of thermistor 11 is sensed in the Wheatstone bridge circuit consisting of thermistor 11 in one leg and the other resistors shown in the other legs. Any unbalance in the bridge provides an input signal to an indicating means which includes amplifier 13, amplifier 15, transistor 17 and diode 18. The signal from bridge 12 to amplifier 13 is fed to amplifier 15 and to transistor 14. RC circuit 16 is used to change the amplification ratio of amplifier 13. That is, RC circuit 16 is connected across the amplifier 13 and used as a feedback mechanism to alter the amplification ratio of amplifier 13.

In the absence of any oil flow over the thermistor 11 the bridge will be in balance and the voltage at the output of amplifier 13 will be in the range of 0.6 to 2 volts. An unbalance in the bridge provides input signal to amplifier 13 resulting in a base drive signal to transistor 14 to reduce current in thermistor 11 and keep the bridge balanced. That is, if transistor 14 is biased on by amplifier 13 then, current through thermistor 11 will be drained by the connection of the emitter on transistor 14 to ground as is shown. Thus, thermistor 11 is prevented from overheating should a loss of oil flow occur. The values of the components of the circuit are selected such that a thermistor temperature of about 100° C. is the maximum allowed before a signal indicates the loss of oil flow.

As long as bridge 12 is unbalanced the output of amplifier 13 will be larger than 5 volts. This voltage is sensed by amplifier 15 which acts as a comparator with a 5 volt reference. If the output of amplifier 13 is greater than 5 volts (indicating oil flow) the output of amplifier 15 will be low (near zero). A low output from amplifier 15 turns off transistor 17 and causes a high output. In case of an oil flow failure, the output of amplifier 13 will be below 5 volts thus causing amplifier 15 output to be high thereby turning on transistor 17 which causes the output to be low. A low output is used to cause the centrifuge drive to stop.

The use of a thermistor to sense fluid flow allows a reliable and low cost method for insuring system reliability. That is, as discussed above, previous devices have sensed pump motor voltage, etc. but have not actually sensed fluid flow. The use of the thermistor in the fluid flow path where the thermal conductivity of the liquid changes the temperature and resistance of the thermistor protects the device in case of a mechanical pump failure or leak in the fluid lines. Using the thermistor in a self-balancing bridge circuit makes the component values less critical than they would be if used in an open loop configuration. The inclusion of transistor 14 in the circuit prevents the thermistor from overheating and destroying itself and the device.

While the invention has been disclosed with respect to a preferred embodiment thereof, it is not to be so limited as changes in modifications may be made without departing from the full and entire scope of the invention as defined by the appended claims. For example, while a Wheatstone bridge has been disclosed as the sensing means to sense the change in resistance of the thermistor, other devices such as a comparator or operational amplifier may be used to sense this change in resistance. In addition, while the invention has been disclosed with respect to sensing oil flow in a centrifuge, the use of a thermistor in any fluid path to sense the flow of that liquid is within the full intended scope of this invention.

What is claimed is:

1. A system for monitoring the maintenance of oil and lubricating fluid flow in a high speed centrifuge comprising:

a single electronic sensor, located in the fluid flow path of the lubricating oil and responsive to heat generated in said sensor when current passes through said sensor and the heat transfer characteristics of said fluid flow;

a normally unbalanced bridge circuit including said sensor as a component thereof and providing a bridge output signal indicating that said bridge circuit is moving towards balance signifying a change in resistance and temperature of said sensor resulting from the passing of current through said sensor and change in the heat transfer characteristics of said fluid flow;

a comparison means receiving at its input said bridge output signal and operative to determine whether said bridge output signal is within a predetermined limit;

feedback means connected between said comparison means and said bridge circuit for controlling the current flow through said bridge circuit to prevent damage to said sensor; and, alarm means connected to said comparison means for indicating a no flow condition when said bridge output signal is outside of said predetermined limit, signifying that the bridge circuit has gone towards a balanced condition.

2. A monitoring system as in claim 1, wherein the electronic sensor is a thermistor;

the comparison means comprises:

an amplifier for receiving and amplifying the bridge output signal;

a comparator;

the amplifier connected at its output to an input of the comparator and providing an amplified bridge output signal to the comparator; and the feedback means further includes:

a transistor; and, the output of the amplifier connected to the transistor for providing a feedback signal through the transistor, said transistor connected to the bridge circuit for controlling the current through the thermistor, maintaining said bridge circuit in a normally unbalanced condition; and the comparator comparing the output of the amplifier with a fixed reference and providing a comparator output signal which activates the alarm means to indicate when the bridge output signal is outside said predetermined limit.

* * * * *